(12) United States Patent
Han

(10) Patent No.: US 6,361,102 B1
(45) Date of Patent: Mar. 26, 2002

(54) FRONT AUTOMOTIVE REINFORCEMENT STRUCTURE FOR DISTRIBUTING IMPACT FORCE

(75) Inventor: Yong-Ha Han, Ulsan (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 09/753,251

(22) Filed: Dec. 27, 2000

(30) Foreign Application Priority Data

Nov. 1, 2000 (KR) .......................................... 00-64579

(51) Int. Cl.⁷ ............................................... B62D 25/08
(52) U.S. Cl. ..................... 296/203.02; 296/30; 296/188
(58) Field of Search ............................ 296/203.02, 30, 296/29, 188, 189, 204, 194

(56) References Cited

U.S. PATENT DOCUMENTS

| | | | | |
|---|---|---|---|---|
| 5,125,715 A | * | 6/1992 | Kijima | 296/189 |
| 5,560,674 A | * | 10/1996 | Tazaki et al. | 296/30 X |
| 5,713,625 A | * | 2/1998 | Takahashi et al. | 296/194 |
| 5,882,065 A | * | 3/1999 | Koiwa et al. | 296/30 X |
| 6,095,592 A | * | 8/2000 | Nakatani | 296/188 |
| 6,145,923 A | * | 11/2000 | Masuda | 296/194 |

* cited by examiner

*Primary Examiner*—Joseph D. Pape
(74) *Attorney, Agent, or Firm*—Christie, Parker & Hale, LLP

(57) ABSTRACT

A front automotive reinforcement structure for distributing impact force applied to a dash panel toward the interior and exterior of an automobile and to weaken the impact force transmitted to the inside of the automobile, thereby preventing injuries to passengers and deformation of the dash panel, wherein a lower portion constituting both left and right sides of a dash panel fixedly supported by a front side member portion is fixedly welded to an upper member supporting an upper part of the lower member and a lateral portion thereof is supported by a lateral member, whereas, between the upper member and lower member, there is a supporting lower reinforcing member along the shape thereof while a dash lower side reinforcing member is supported by welding to the lower member and to the inner side of the dash panel.

2 Claims, 5 Drawing Sheets

FRONT AUTOMOTIVE REINFORCEMENT STRUCTURE FOR DISTRIBUTING IMPACT FORCE

CROSS-REFERENCE TO RELATED APPLICATION

This application claims priority of Korea patent Application No. 2000-64579, filed on Nov. 1, 2000.

BACKGROUND OF THE INVENTION

1. Field of the Invention

The present invention relates to a front automotive reinforcement structure for distributing impact force, and more particularly to a front automotive reinforcement structure for distributing impact force adapted to distribute impact applied to front of an automobile to the sides thereof to thereby reinforce a shock-absorbing function relative to the shock and to limit injuries to passengers at the same time.

2. Description of the Prior Art

In general, a high speeding automobile, in a collision, there are structures for effectively absorbing and dispersing shock applied from various directions to maximally avoid distortion and breakage of the automobile, and to maximally prevent injuries of passengers while the automobile collides other automobiles or objects.

The main object of prior art shock absorption/dispersion structures is to prevent shock applied to the engine area equipped with principal apparatuses such as an engine, transmission and the like, which comprises the front part of an automobile, from being forced into the inside of the automobile, and adopts a system for effectively absorbing and dispersing the shock or impact applied through the dash panel constituting a border between the front part of the automobile and the driver's seat.

FIG. 1 is a schematic drawing illustrating a dash panel (D) for effectively absorbing and dispersing shock upon impact, where the dash panel (D) includes left and right front side members for supportively fixing the panel (D), lower portions constituting left and right sides of the panel (D) for being fixedly welded to upper member 1 supporting the upper side of lower member 2 and for supporting the sides thereof by lateral member 4.

At this location, between the upper member 1 and the front side rear lower member 2, there is a lower reinforcing member 3 as a support along its contour for reinforcing the strength thereof.

When a shock is applied by a lateral front collision of an automobile, the applied shock front (F) is absorbed by engine (E) and the like at the engine area, as illustrated in FIG. 2, whereby the shock is initially absorbed and dispersed by a vertically divided force transmitted to an opposite lateral portion thereof, such that an initial weakened pressure (F1) is transmitted to a portion of the dash panel (D) dividing the engine area and the interior of the automobile.

Successively, the initial weakened pressure (F1) of shock force (F) delivered to the dash panel (D) is again absorbed by members 1, 2 and 3 and lateral member 4 to disperse same outside of the automobile via an external dispersing force (Fm), thereby allowing only the second decreased pressure (F2) to be transmitted into the interior of the automobile.

However, there is a problem in that, although the initial shock (F) is sequentially weakened in pressure thereof through the engine area and the dash panel (D) to thereafter travel toward the interior of the automobile, the dispersed and absorbed degree of the shock may not always prevent injuries to the passengers, and members 1, 2 and 3 are severely damaged by the initial weakened pressure (F1) of the shock (F).

Another problem is that the external dispersing force (Fm) from the initial weakened pressure (F1) which is decreased in force by being dispersed and absorbed by the lateral member 4 does not have a great effect, and the second weakened pressure (F2) absorbed by the members 1, 2 and 3 and delivered toward the interior of the automobile is relatively greater than the external dispersing force (Fm), making it unable to effectively absorb and distribute the applied impact force.

SUMMARY OF THE INVENTION

The present invention is disclosed to solve the aforementioned problems and it is an object of the present invention to provide a front automotive reinforcement structure for distributing impact force applied to a dash panel toward interior and exterior of an automobile and to weaken the impact force transmitted to the inside of the automobile, thereby preventing injuries to passengers and deformation of the dash panel.

In accordance with the objects of the present invention, there is provided a front automotive reinforcement structure for distributing impact force, wherein a lower portion constituting the left and right sides of a dash panel fixedly supported by a front side member portion is fixedly welded to upper member supporting an upper part of lower member and a lateral portion thereof is supported by lateral member, whereas, between upper member and lower member, there is a support for the lower reinforcing member along the shape thereof while a dash lower side reinforcing member is supported by welding to the lower member and to the inner side of the dash panel.

BRIEF DESCRIPTION OF THE DRAWINGS

For a fuller understanding of the nature and objects of the invention, reference should be made to the following detailed description taken in conjunction with the accompanying drawings in which.

DETAILED DESCRIPTION OF THE INVENTION

Now, the preferred embodiment of the present invention will be described in detail with reference to the accompanying drawings.

Figure 1:
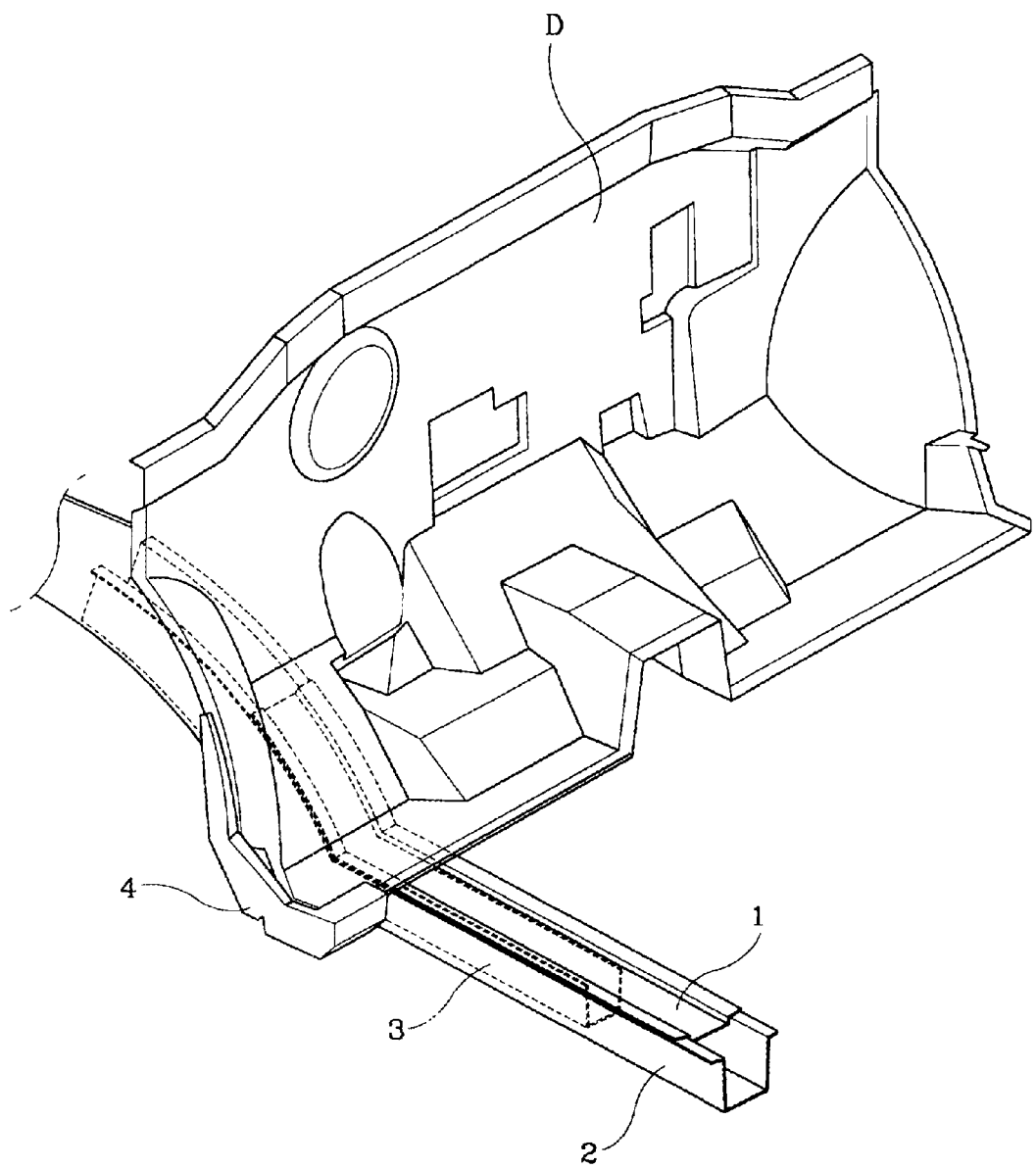
FIG. 1 is a perspective view for illustrating a front interior structure of an automobile according to the prior art.
Figure 2:
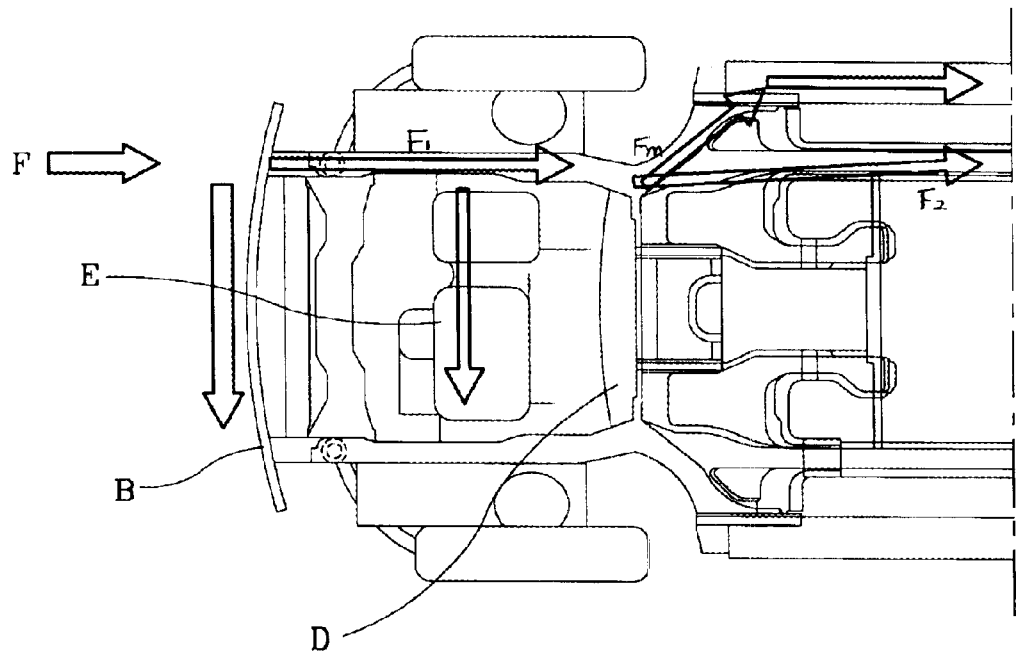
FIG. 2 is an operational drawing for illustrating impact distribution of an automobile according to the prior art.
Figure 3:
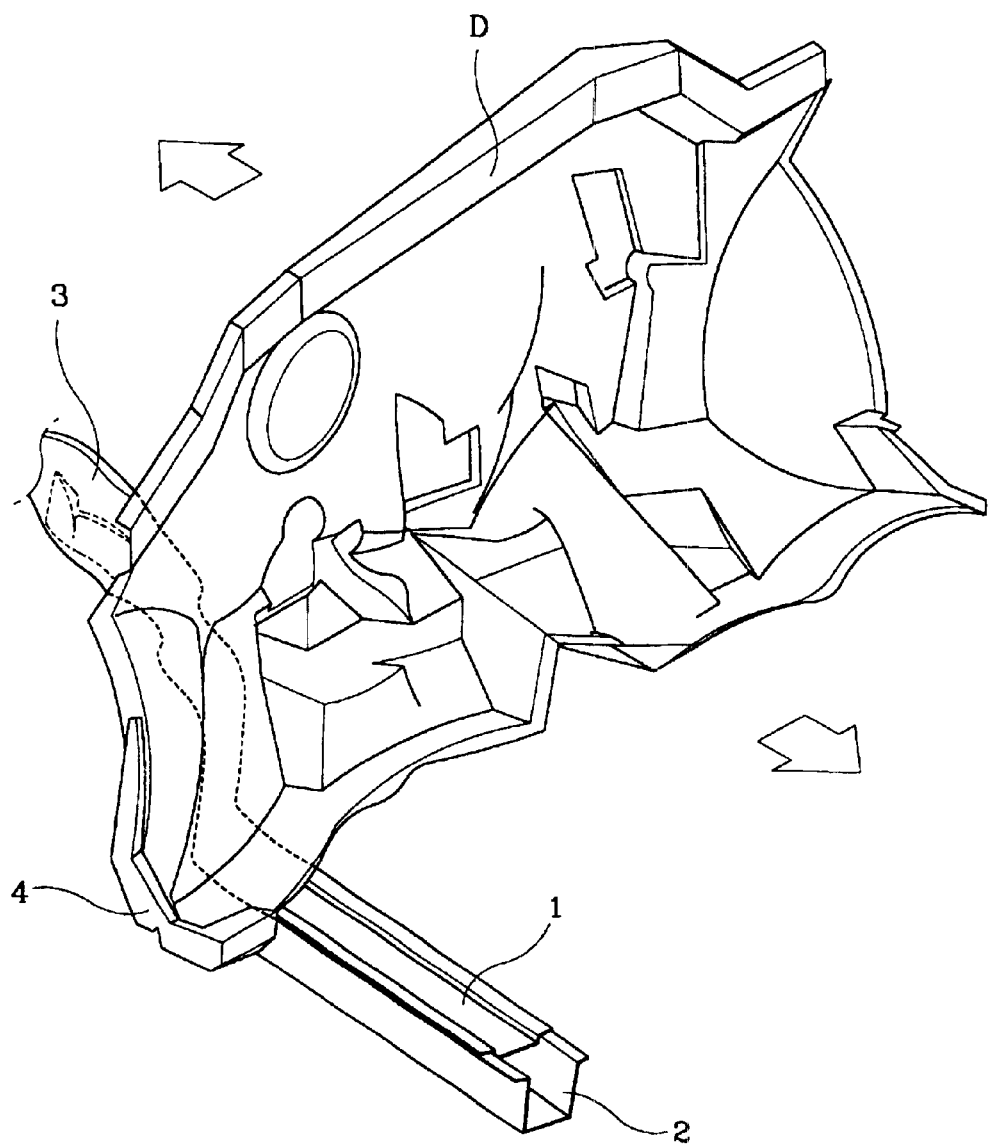
FIG. 3 is a drawing of constitutional deformed state in a front interior structure according to the prior art.
Figure 4:
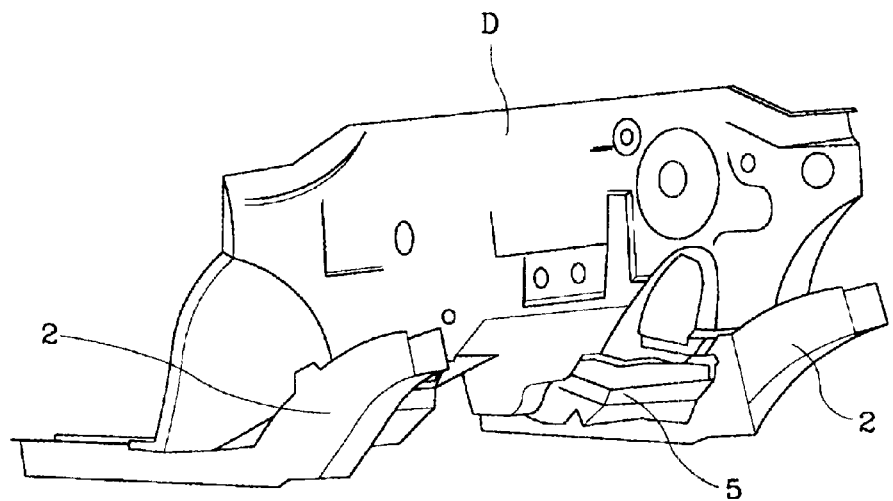
FIG. 4 is a perspective view for illustrating a front interior structure of an automobile having an impact distribution function according to the present invention.
Figure 5:
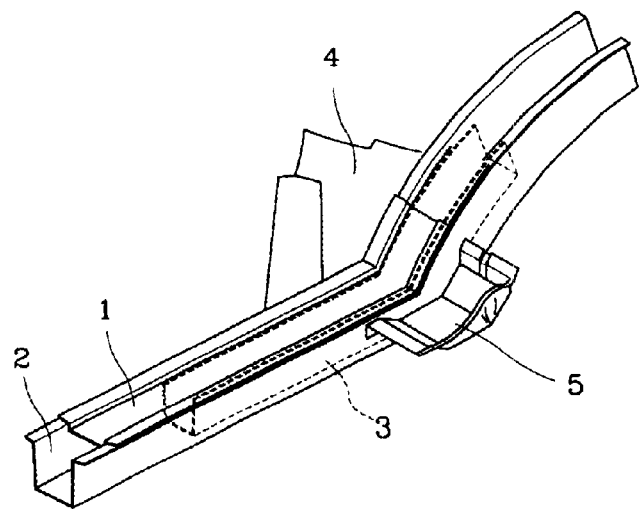
FIG. 5 is a partial perspective view for illustrating a portion having a function of distribution impact according to the present invention.

FIGS. 4 and 5 are perspective views for illustrating a front interior structure of an automobile having an impact distributing function according to the present invention, wherein a lower portion constituting both left and right sides of a dash panel (D) fixedly supported by a front side member portion is fixedly welded to upper member 1 supporting an upper part of lower member 2 and a lateral portion thereof is supported by lateral member 4, whereas, between the upper member 1 and lower member 2, there is a support for lower reinforcing member 3 along the shape thereof while a dash lower side reinforcing member 5 is supported by welding to lower member 2 and to the inner side of the dash panel (D).

Figure 6:
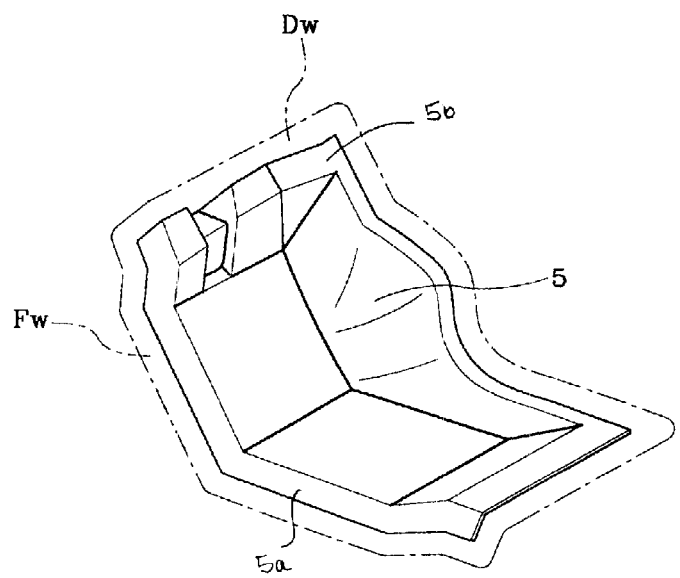
FIG. 6 is a perspective view of a reinforcement member for reinforcing a front interior structure of an automobile according to the present invention.

At this time, as illustrated in FIG. 6, the dash lower side reinforcing member 5 is formed at a lateral side thereof with a lateral flange 5a welded and bent at a right angle along the external side of the lower member 2 to provide a lower attachment region (Fw), while the member 5 is formed at the other lateral side thereof with an upper flange 5b welded along the shape of the dash panel (D) and bent at a right angle against the lateral flange 5a to provide a dash attachment region (Dw).

Now, the operation of the present invention will be described in detail.

Figure 7:
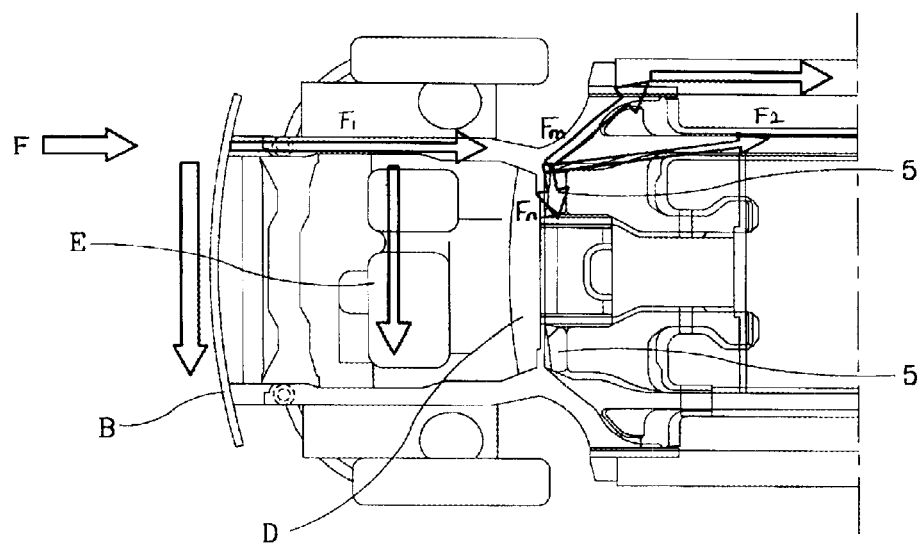
FIG. 7 is an operational view illustrating the impact distribution of an automobile according to the present invention.

When a shock is applied by a lateral front collision of an automobile, the applied shock force (F) is absorbed by engine (E) and the like at the engine area, as illustrated in FIG. 7, whereby the shock is initially absorbed and dispersed by a vertically divided force transmitted to an opposite lateral portion thereof, such that an initial weakened pressure (F1) is transmitted to portion of the dash panel (D) dividing the engine area and the interior of the automobile.

Successively, the initial weakened pressure (F1) delivered to the dash panel (D) is absorbed by the upper member 1, front side rear lower member 2 and lower reinforcing member 3 respectively, is secured at a lower side of the dash panel (D) and simultaneously dispersed to an inner dispersion force (Fn) and an outer dispersion force (Fm), each distributed into and outside of an automobile, by lateral member 4 and the dash lower side reinforcing member 5, whereby a second weakened pressure (F2) of relatively weaker force is transmitted to the interior of the automobile.

In other words, the initial weakened pressure (F1) transmitted to the dash panel (D) deforms the respective members 1, 2 and 3 fixedly welded to the lower side of the dash panel (D) to generate the outer dispersion force (Fm) distributed outside of the automobile through lateral member 4 mounted at the lower lateral surface of dash panel (D).

Furthermore, the initial weakened pressure (F1) creates the inner dispersion force (Fn) dispersed into the interior of the automobile according to the lateral surface of the upper member 1 and dash lower side reinforcing member 5 fixedly welded to the inner surface of dash panel (D), whereby the initial weakened pressure (F1) is divided to the outer dispersion force (Fm) and the inner dispersion force (Fn), such that the second weakened pressure delivered into the interior of the automobile is reduced in intensity thereof in proportion to the size of the inner dispersion force (Fn).

As apparent from the foregoing, there is an advantage in the front automotive reinforcement structure for distributing impact force thus described according to the present invention in that, a dash lower side reinforcing member is fixedly welded to a dash panel and a lateral surface of member, the dash panel having received an impact force applied to the lateral front side of an automobile and to the engine area increases the degree of absorption and dispersion of the impact force, thereby limiting deformation of member mounted at a lower portion of the dash panel.

Furthermore, there is another advantage in that the impact force reduced in intensity thereof by passing through the engine area, is divided to an outer dispersion and an inner dispersion force, by lateral member and dash lower side reinforcing member mounted at the dash panel such that the second weakened pressure delivered into the interior of the automobile is reduced in intensity thereof in comparison with the initial impact force in proportion to the size of the inner dispersion force.

What is claimed is:

1. A front automative reinforcement structure for distributing impact force, wherein a lower portion constituting left and right sides of a dash panel fixedly supported by a front side member portion is fixedly welded to an upper member supported by an upper part of a lower member and a lateral portion thereof is supported by a lateral member, whereas, between the upper member and the lower member, there is supported a lower reinforcing member along the shape thereof while a dash lower side reinforcing member is supported by welding to the lower member and an inner side of the dash panel.

2. The structure as defined in claim 1, wherein the dash lower side reinforcing member is formed at a lateral side thereof with a lateral flange welded and bent at a right angle along an external side of the lower member to provide a lower member attachment region, while the member is formed at the other lateral side thereof with an upper flange welded along the shape of the dash panel and bent at a right angle against the lateral flange to provide a dash attachment region.

* * * * *